US011861914B2

(12) United States Patent
Kurotobi et al.

(10) Patent No.: US 11,861,914 B2
(45) Date of Patent: Jan. 2, 2024

(54) OBJECT RECOGNITION METHOD AND OBJECT RECOGNITION DEVICE

(71) Applicant: Nissan Motor Co., Ltd., Yokohama (JP)

(72) Inventors: Tomoko Kurotobi, Kanagawa (JP); Kuniaki Noda, Kanagawa (JP); Haruo Matsuo, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 68 days.

(21) Appl. No.: 17/637,720

(22) PCT Filed: Aug. 28, 2019

(86) PCT No.: PCT/IB2019/001359
§ 371 (c)(1),
(2) Date: Feb. 23, 2022

(87) PCT Pub. No.: WO2021/038267
PCT Pub. Date: Mar. 4, 2021

(65) Prior Publication Data
US 2022/0270375 A1    Aug. 25, 2022

(51) Int. Cl.
*G06V 20/58*    (2022.01)
*G06T 7/70*    (2017.01)
*G06V 10/75*    (2022.01)

(52) U.S. Cl.
CPC .......... *G06V 20/58* (2022.01); *G06T 7/70* (2017.01); *G06V 10/757* (2022.01); *G06T 2207/10028* (2013.01); *G06T 2207/30261* (2013.01)

(58) Field of Classification Search
None
See application file for complete search history.

(56) References Cited

U.S. PATENT DOCUMENTS

2017/0345180 A1* 11/2017 Sugiura ................. G06V 20/58

FOREIGN PATENT DOCUMENTS

EP   3330893 A1   6/2018
JP   H10-283477 A   10/1998
(Continued)

OTHER PUBLICATIONS

Efficient Rectangle Fitting of Sparse Laser Data for Robust On-Road Object Detection. Yang et al. (Year: 2018).*

(Continued)

*Primary Examiner* — Delomia L Gilliard
(74) *Attorney, Agent, or Firm* — Young Basile Hanlon & MacFarlane, P.C.

(57) ABSTRACT

An object recognition method uses a sensor configured to acquire a position of an object existing in a surrounding environment as point clouds including a plurality of detection points in a top view. The method includes: grouping point clouds according to a proximity; determining, when performing polygon approximation on the grouped point clouds, whether at least part of the detection points constituting the grouped point clouds are located in a blind zone of an approximate polygon acquired by the polygon approximation with respect to the sensor; recognizing the grouped point clouds as point clouds corresponding to plural objects when it is determined that the detection points are located in the blind zone with respect to the sensor; and recognizing the grouped point clouds as point clouds corresponding to a single object of the approximate polygon when it is determined that the detection points are not located in the blind zone.

9 Claims, 12 Drawing Sheets

(56) References Cited

FOREIGN PATENT DOCUMENTS

| | | | |
|---|---|---|---|
| JP | 2012-173230 A | | 9/2012 |
| JP | 2012173230 A | * | 9/2012 |
| JP | 2013-041315 A | | 2/2013 |
| JP | 2016-148514 A | | 8/2016 |
| JP | 2018-092603 A | | 6/2018 |

OTHER PUBLICATIONS

S. Yang et al., "Efficient Rectangle Fitting of Sparse Laser Data for Robust On-Road Obiect Detection," 2018 IEEE Intelligent Vehicles Symposium (IV), 2018, pp. 1-8, doi: 10.1109/IVS.2018.8500716.

* cited by examiner

OBJECT RECOGNITION METHOD AND OBJECT RECOGNITION DEVICE

TECHNICAL FIELD

The present invention relates to an object recognition method and an object recognition device.

BACKGROUND

In related art, an object tracking device that measures a position of a detection target vehicle traveling around an own vehicle by using a transmission/reception sensor using a laser is known (see JP 2016-148514 A).

SUMMARY

According to the above device disclosed in JP 2016-148514 A, a reference point of an object position is calculated by grouping points close to each other in a point group acquired with the transmission/reception sensor and approximating as a rectangle. Simply grouping the points close to each other, however, may erroneously recognize point clouds that belongs to a plurality of close objects as a point cloud that belongs to the same object. For example, when an L-shaped recess is formed by side surfaces of two objects, point clouds belonging to the side surfaces of the two objects may be erroneously recognized as a point cloud of the same object. In this case, if performing the rectangle approximation on the basis of the point clouds, it may be recognized that a rectangular object (a convex object) exists in the recess where such object does not exist, which is a problem.

It is an object of the present invention to provide a technique that can correctly recognize a position of an object existing in a surrounding environment by determining whether or not point clouds acquired by using a sensor is point clouds corresponding to a plurality of objects (plural objects).

An object recognition method is one aspect of the present invention is an object recognition method using a sensor configured to acquire a position of an object existing in a surrounding environment as point clouds including a plurality of detection points in a top view. The method including: grouping the point clouds according to a proximity; determining, when performing polygon approximation on the grouped point clouds, whether or not at least part of the detection points constituting the grouped point clouds are located in a blind zone of an approximate polygon acquired by the polygon approximation on the point clouds with respect to the sensor; recognizing the grouped point cloud as point clouds corresponding to plural objects when it is determined that the detection points are located in the blind zone with respect to the sensor; and recognizing the grouped point clouds as point clouds corresponding to a single object of the approximate polygon when it is determined that the detection points are not located in the blind zone with respect to the sensor.

Embodiments of the present invention will be described in detail below with reference to the accompanying drawings.

DETAILED DESCRIPTION

First Embodiment

Figure 1:
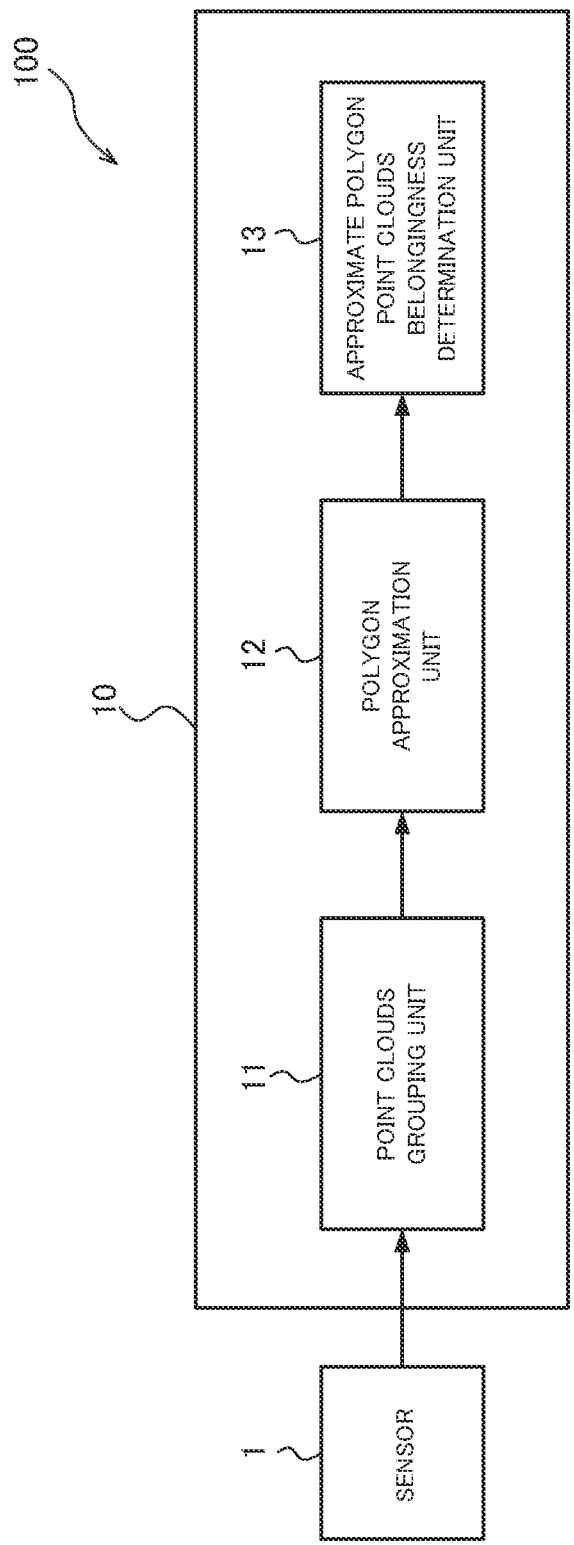
FIG. 1 is a block diagram showing a configuration example of an object recognition device according to a first embodiment.

FIG. 1 is a block diagram showing a configuration example of an object recognition device 100 according to a first embodiment of the present invention. The object recognition device 100 in this embodiment is applied to, for example, an automobile.

The object recognition device 100 in this embodiment includes a sensor 1 and a controller 10 that processes information acquired by the sensor 1. The controller 10 includes a point clouds grouping unit 11, a polygon approximation unit 12, and an approximate polygon point clouds belongingness determination unit 13.

The sensor 1 acts as a three-dimensional point clouds acquisition unit that acquires three-dimensional point clouds data of a surrounding environment of the sensor 1, that is, an object existing in a surrounding environment of a vehicle on which the object recognition device 100 is mounted according to this embodiment. The sensor 1 is assumed to be, for example, a light detecting and ranging sensor (LiDAR), a radar, or a stereo camera, and LiDAR is adopted as the sensor 1 in this embodiment. The acquired three-dimensional point clouds data (hereinafter, simply referred to as "point clouds") is input to the controller 10. An example of the acquired point clouds will be described later with reference to FIG. 2.

The controller 10 includes, for example, a central processing unit (CPU), a read-only memory (ROM), a random-access memory (RAM), and an input/output interface (I/O interface). The ROM included in the controller 10 stores a program for executing each function of each functional unit described below. In other words, the controller 10 implements functions of the point clouds grouping unit 11, the polygon approximation unit 12, and the approximate polygon point clouds belongingness determination unit 13 described below by executing various programs stored in the ROM.

The point clouds grouping unit 11 projects point clouds acquired by the sensor 1 onto a two-dimensional plane parallel to ground, and groups the point clouds according to a proximity of the point clouds. As such a grouping method, a method called Euclidean Clustering is used in this embodiment, but the method is not limited to this method, and another method of grouping according to the proximity of the point clouds may be used.

The polygon approximation unit 12 performs so-called polygon fitting in which the point clouds grouped by the point clouds grouping unit 11 are approximated to a predetermined polygon.

The approximate polygon point clouds belongingness determination unit 13 determines, on the basis of a positional relation between the sensor 1 and the approximate polygon approximated by the polygon approximation unit 12, whether or not the sides corresponding to the grouped point clouds among sides constituting the approximate polygon are blind zones when viewed from the sensor 1. When the approximate polygon point clouds belongingness determination unit 13 determined that the sides corresponding to the grouped point clouds are the blind zones when viewed from the sensor 1, then determines that the point clouds corresponding to the sides belong to a plurality of objects (plural objects), and recognizes that the point clouds indicate positions of the plural objects. Meanwhile, when the approximate polygon point clouds belongingness determination unit 13 determined that the sides corresponding to the grouped point clouds are not the blind zone when viewed from the sensor 1, then determines that the point clouds constituting the sides belong to one object (single object), and recognizes that the point clouds indicate a position of the single object corresponding to the approximate polygon generated by the polygon approximation.

With such a configuration, the object recognition device 100 can determine whether an object indicated by acquired point clouds indicates a single object or plural objects.

Subsequently, details of a method for determining whether the acquired point clouds indicate a single object or plural objects will be described with reference to FIGS. 2 and 3.

Figure 2:
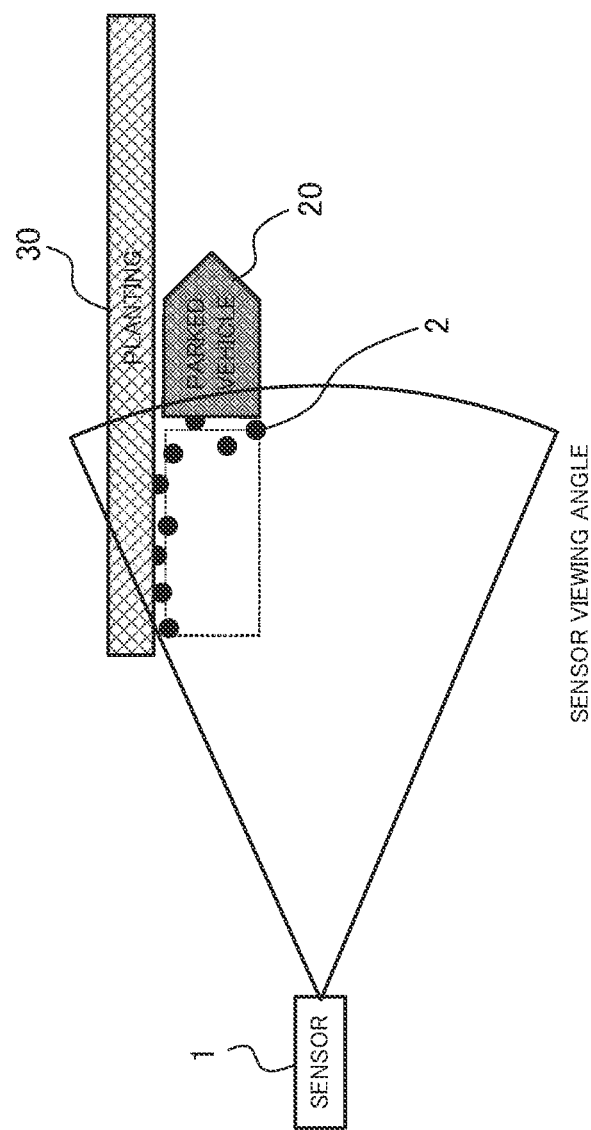
FIG. 2 is a diagram illustrating an example of point clouds acquired by the object recognition device.

FIG. 2 is a diagram illustrating an example of point clouds acquired by the object recognition device 100. In the example shown in FIG. 2, a situation is shown in which a vehicle 20 is parked adjacent to a planting 30 on a side of a road (near a boundary between the road and a sidewalk) in front of a vehicle on which the sensor 1 is mounted. A fan-shaped line extending from the sensor 1 indicates a viewing angle of the sensor 1, and a direction in which the viewing angle expands when viewed from the sensor 1 is a front of the vehicle.

Here, the sensor 1 adopted as the three-dimensional point clouds acquisition unit in this embodiment is LiDAR or a sensor that outputs laser lights (emission waves) toward a plurality of directions within the viewing angle, and detects the laser lights (reflected waves) that hit and reflected at a plurality of reflection points on a surface of an object existing in the viewing angle, and then acquire relative positions with respect to the sensor 1 of plural reflection points 2 (hereinafter, simply referred to as the reflection points 2) corresponding to positions of a side surface of the object on the sensor 1 side. The object recognition device 100 recognizes a position of the object existing in a surrounding environment of the object recognition device 100 on the basis of point clouds including plural detection points which acquired as plural reflection points 2 by using the sensor 1.

The sensor 1 may be any sensor as long as it can acquire a position of an object surface as a point clouds within a viewing angle, and is not limited to a radar or LiDAR. The sensor 1 may be, for example, a stereo camera. That is, the object recognition device 100 can calculate a position of an object surface for each pixel corresponding to an object existing within a predetermined viewing angle (an angle of view) imaged by, for example, the stereo camera, and recognize a position of the object existing in the surrounding environment of the object recognition device 100 on the basis of point clouds having positions corresponding to each pixel as detection points.

In the following description, it is assumed that the sensor 1 adopted as the three-dimensional point group acquisition unit is LiDAR or a radar.

Here, in a scene shown in FIG. 2, as a result of grouping the point clouds acquired by the sensor 1 according to the proximity of the point clouds, point clouds at a side surface of the planting 30 on the sensor 1 side and point clouds at a rear end of the parked vehicle 20 may be grouped together. That is, in reality, point clouds corresponding to the plural objects including the planting 30 and the parked vehicle 20 may be grouped together as point clouds corresponding to one object (a single object). Thus, in the related art, rectangular approximation as polygon approximation is performed on the basis of the point clouds grouped as the single object, as a result, a dotted rectangular approximate polygon (an approximate rectangle) shown in FIG. 2 is generated. When such an approximate rectangle is generated, it is recognized that the single object corresponding to the approximate rectangle exists at the position where the approximate rectangle is generated. However, the position where the approximate rectangle is generated is actually a recess formed by arranging plural objects of the planting 30 and the parked vehicle 20 in an L-shape, and thus, there is a problem that the position of the object recognized by the approximate rectangle acquired by the polygon approximation and positions of actual objects are different from each other.

In this embodiment, in order not to cause such a difference, it is determined whether or not the point clouds acquired by using the sensor 1 are point clouds corresponding to plural objects. If it can be determined that the point clouds correspond to the plural objects, even if an approximate polygon is once generated by the polygon approximation, it can be correctly recognized that the position where the approximate polygon is generated is a recess formed by the plural objects, and no object exists at that position. Hereinafter, the details of the method for determining whether or not the point clouds acquired by using the sensor 1 correspond to the plural objects will be described.

Figure 3:
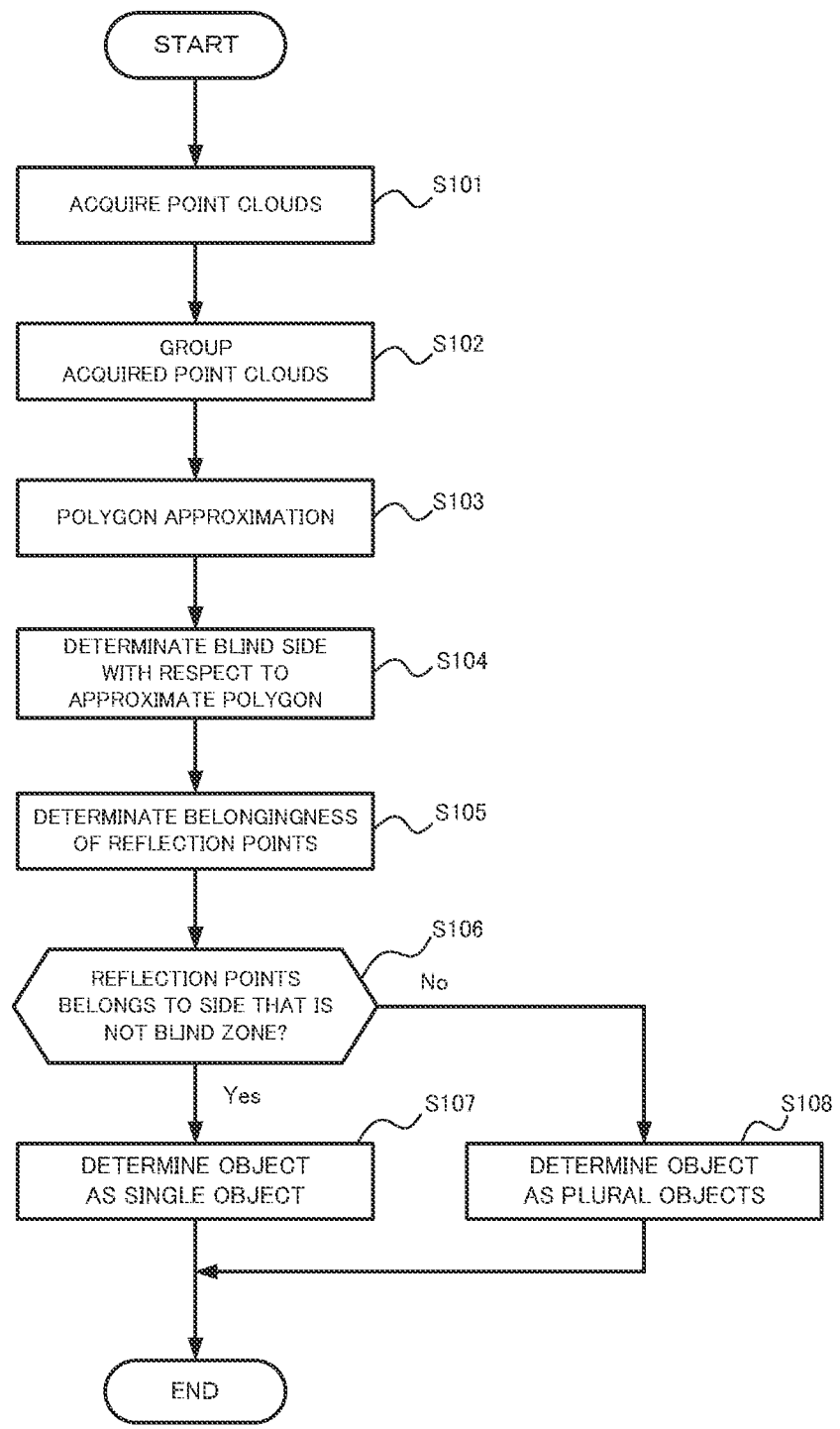
FIG. 3 is a flowchart illustrating an object recognition method by the object recognition device according to the first embodiment.

FIG. 3 is a flowchart illustrating an object recognition method by the object recognition device 100 according to this embodiment. Processes illustrated in the flowchart are programmed in the controller 10 so as to be constantly executed at regular intervals while the object recognition device 100 is activated.

In step S101, the controller 10 acquires the point clouds including plural reflection points 2 by using the sensor 1. When the point clouds are acquired, a process in the following step S102 is executed.

In step S102, the controller 10 projects the point clouds acquired in step S101 onto the two-dimensional plane parallel to the ground, and groups the point clouds according to the proximity of the point clouds.

In step S103, the controller 10 performs the polygon approximation (polygon fitting) based on the point clouds grouped in step S102. The polygon approximated in this embodiment is a quadrangle (rectangle), but may be a triangle or another polygon. The approximate polygon is fitted so that an error between positions of sides constituting the approximate polygon and positions of the point clouds is the smallest.

In step S104, the controller 10 performs a blind sides determination with respect to an approximate polygon. In the blind side determination, the controller 10 identifies a side that is located in a blind zone of the approximate polygon (a side which includes the reflection points 2 located in the blind zone, also referred to as the blind side below) when viewed from the sensor 1 among the sides constituting the approximate polygon approximated in step S103. In other words, the side of the approximate polygon which does not correspond to the sensor 1 is identified. Details of a method for identifying the side that is located in a blind zone will be described with reference to FIG. 4.

FIG. 4 is a diagram illustrating a method for determining the blind sides with respect to the approximate polygon according to this embodiment. Rectangles whose four corners are indicated by A to D in the diagram are the rectangles (approximate rectangles) approximated based on the point clouds acquired in step S101.

Figure 4A:
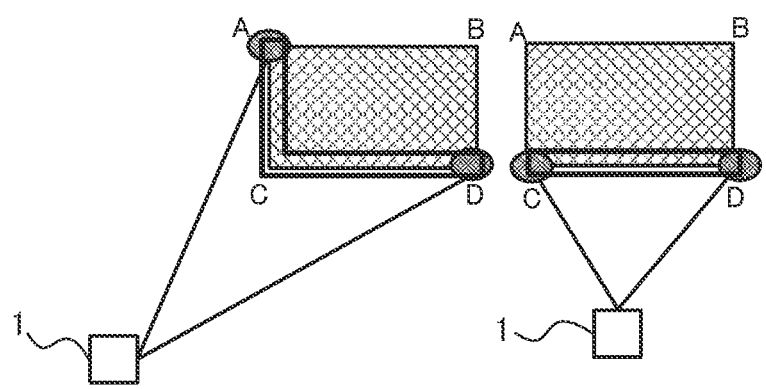
FIG. 4 is a diagram illustrating a method for determining blind sides constituting an approximate polygon.

FIG. 4(a) is a diagram illustrating an example of the method for determining the blind sides with respect to the approximate polygon. In the present example, the side that can be observed by the sensor 1 (the side that is not located in a blind zone when viewed from the sensor 1 and faces the sensor 1) is first identified on the basis of a relation between sides constituting the approximate rectangle generated in the polygon approximation and the sensor 1, and then other sides are identified as blind sides.

Specifically, first, a point closest to the sensor 1 and points on both sides of the point are identified, among the points A to D of the four corners of the approximate rectangle, and therefore a total three points are identified. Then, two of the identified three points are selected, and a combination of two points which maximizes an angle formed by a line connecting each of the selected two points and the sensor 1 is examined.

Referring to a diagram on a left side of FIG. 4(a), the point closest to the sensor 1 is a point C, and the points on both sides of the point C are points A and D. As shown in the diagram, the combination of the two points, which maximizes the angle formed by the line connecting the two points among the three points A, C, and D and the sensor 1, is the points A and D.

Referring to a diagram on a right side of FIG. 4(a), the point closest to the sensor 1 is the point C, and the points on both sides of the point C are the points A and D. As shown in the diagram, the combination of the two points, which maximizes the angle formed by the line connecting the two points among the three points A, C, and D and the sensor 1, is the points C and D. If respective distances the points C and D to the sensor 1 are the same and they are the closest points, either the point C or the point D can be selected.

Among the sides constituting the approximate rectangle, all the line segments, which connect the two points selected as the combination of the two points which maximizes the angle and the point closest to the sensor 1, are identified as the sides that can be observed by the sensor 1, and the other sides are identified as the blind sides. With reference to the diagram on the left side of FIG. 4(a), observable sides are identified as a side A-C and a side C-D which are sides surrounded by thick solid lines in the diagram, and blind sides are identified as a side A-B and a side B-D which are sides other than the observable sides. With reference to the diagram on the right side of FIG. 4(a), the observable side is identified as a side C-D which is a side surrounded by the thick solid lines in the diagram, and blind sides are identified as the side A-B, the side A-C, and the side B-D which are sides other than the observable side.

Figure 4B:
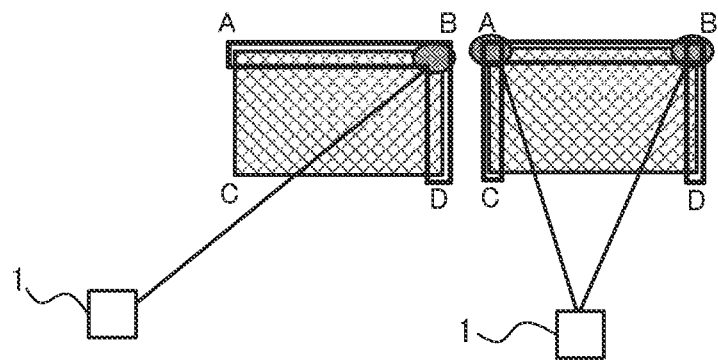

FIG. 4(b) is a diagram illustrating another example of the method for determining the blind sides with respect to the approximate polygon. In the present example, the blind side is directly identified without identifying the observable side.

Specifically, one of the four points A to D of the approximate rectangle is selected, when a straight line connecting the selected point and the sensor 1 intersects sides other than sides connected to the selected point, the sides connected to the selected point are identified as blind sides. By examining all of the points A to D, the blind sides can be identified from all the sides constituting the approximate rectangle.

With reference to a diagram on a left side of FIG. 4(b), a straight line connecting the point B and the sensor 1 intersects the side C-D which is a side other than the side A-B and the side B-D connected to the point B, and thus, the side A-B and the side B-D, which are the sides connected to the point B and surrounded by the thick solid lines in the diagram, are identified as the blind zone sides.

With reference to a diagram on a right side of FIG. 4(b), a straight line connecting the point A and the sensor 1 intersects the side C-D which is a side other than the side A-B and the side A-C connected to the point A, and thus, the side A-B and the side A-C, which are the sides connected to the point A and surrounded by the thick solid lines in the diagram, are identified as the blind sides. Further, a straight line connecting the point B and the sensor 1 intersects the side C-D which is a side other than the side A-B and the side B-D connected to the point B, and thus, the side A-B and the side B-D connected to the point B are also identified as the blind sides. It should be noted that the method described with reference to FIG. 4(b) can be applied not only to a rectangular approximate rectangle but also to all other polygonal shapes.

In this way, when the sides, which are located in the blind zones when viewed from the sensor 1 among the sides constituting the approximate rectangle, are identified, a process in a subsequent step S105 is performed (see FIG. 3).

In step S105, the controller 10 performs a determination of a belongingness of reflection points to an approximate polygon. In the determination of the belongingness of reflection points to the approximate polygon, the controller 10 determines which side of the sides constituting the approximate rectangle the plural reflection points 2 constituting the point clouds which are bases of the approximate rectangle generated by the polygon approximation correspond to (belong to). More specifically, the controller 10 determines whether or not the plural reflection points 2 constituting the point clouds acquired in step S101 belong to a side that is not the blind side (a side that can be observed by the sensor 1) specified in step S104. A method for determining a side to which the reflection points 2 belong will be described with reference to FIG. 5.

Figure 5:
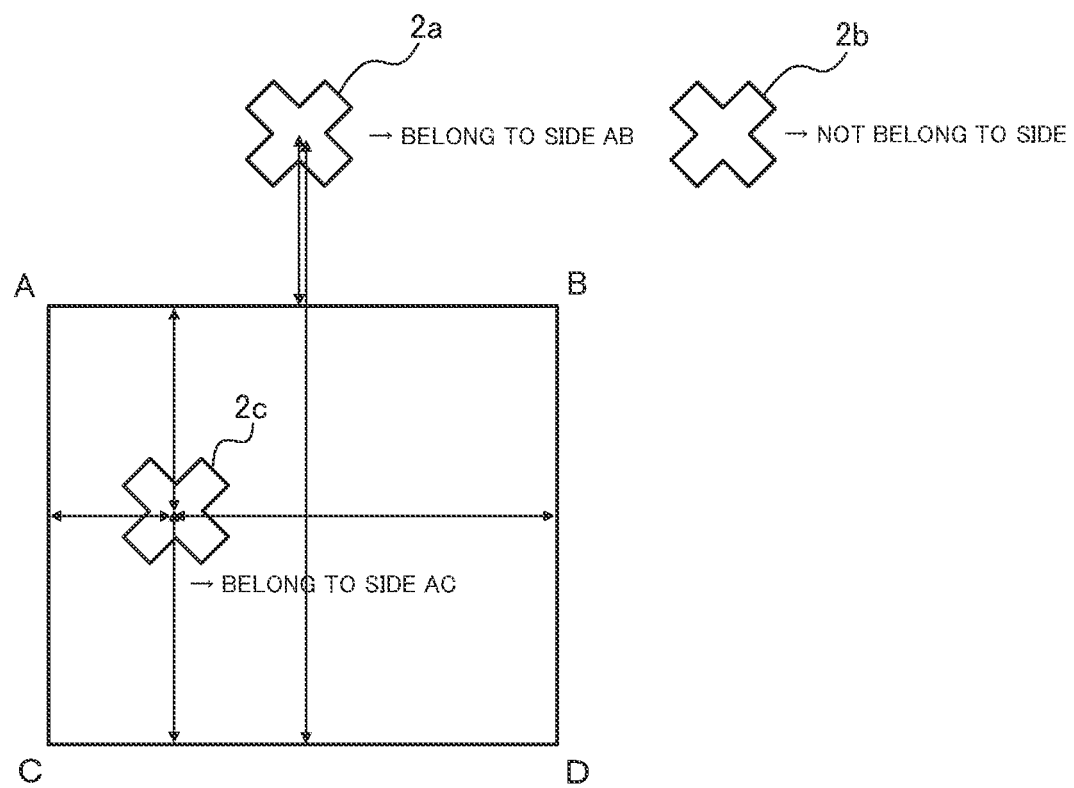
FIG. 5 is a diagram illustrating an example of a method for determining a belongingness of reflection points to an approximate polygon.

FIG. 5 is a diagram illustrating an example of a method for determining a belongingness of reflection points to an approximate polygon according to this embodiment. A rectangle represented by four corner points A to D indicates the approximate rectangle approximated in step S103. Reflection points 2a, 2b, and 2c indicate a part of the plurality of reflection points 2 constituting the point groups acquired in step S101. In the determination of the belongingness of reflection points to the approximate polygon, based on a part of the plurality of reflection points 2 constituting the acquired point groups, it is determined which side of the sides constituting the approximate rectangle the point clouds formed by the reflection points 2 belong to.

In the present example, first, perpendicular lines are drawn from the reflection points 2 to the sides constituting the approximate rectangle. In this case, when the perpendicular lines cannot be drawn from the reflection points 2 to the sides constituting the approximate rectangle, it is determined that there is no side to which the reflection points 2 belong. Meanwhile, when there are intersections between the perpendicular lines drawn from the reflection points 2 and the sides of the approximate rectangle, it is determined that the reflection points 2 belong to a side whose distance from the reflection points 2 to the intersections is the smallest among the sides where the intersections exist.

With reference to FIG. 5, for example, at the reflection point 2a, perpendicular lines can be drawn on a side A-B and a side C-D. In the two perpendicular lines drawn from the reflection point 2a, a side where an intersection with a perpendicular line having a minimum length exists is the side A-B. Thus, the reflection point 2a is determined to belong to the side A-B.

Since the reflection point 2b cannot have a perpendicular line drawn on any side, it is determined that a side to which the reflection point belongs does not exist.

The reflection point 2c can draw perpendicular lines on all sides, but among these perpendicular lines, an intersection with a perpendicular line having a smallest length exists on a side A-C. Therefore, the reflection point 2c is determined to belong to the side A-C.

In this way, it is possible to determine which side of the sides constituting the approximate rectangle the reflection points 2 constituting the point clouds acquired in step S101 belong to. When it is determined the side to which the reflection points 2 belong, a process in the following step S106 is performed.

In step S106, the controller 10 determines whether or not the reflection points 2 constituting the point clouds acquired in step S101 belong to a side that is not located in a blind zone when viewed from the sensor 1 among the sides constituting the approximate rectangle. That is, the controller 10 determines whether or not the side, determined in step S105, to which the reflection points 2 belong is a side (observable side) other than the blind sides. When it is determined that reflection points 2 belonging to a side other than the blind sides exist among the plural reflection points 2 constituting the point clouds acquired in step S101, it is determined that the reflection points 2 are not located in the blind zones of the approximate rectangle with respect to the sensor 1, and then a process in step S107 is performed. Meanwhile, when it is determined that there are no reflection points 2 belonging to a side other than the blind sides, that is, when it is determined that the reflection points 2 belong to the blind sides, it is determined that the reflection points 2 are located in the blind zones of the approximate rectangle with respect to the sensor 1, and then a process in step S108 is performed.

In step S107, it is determined that the reflection points 2 constituting the acquired point clouds belong to a side that is not located in a blind zone, and thus, the controller 10 determines that the reflection points 2 are not located in the blind zones of the approximate rectangle with respect to the sensor 1, and determines that the object indicated by the point clouds acquired in step S101 is a single object. As a result, the object recognition device 100 recognizes that an object having an outer shape corresponding to the approximate rectangle actually exists in a top view at a position of the approximate rectangle generated by the polygon approximation based on the point clouds acquired in step S101.

Meanwhile, in step S108, it is determined that the reflection points 2 constituting the acquired point clouds belong to the blind sides, and thus, the controller 10 determines that the reflection points 2 are located in the blind zone of the approximate rectangle with respect to the sensor 1, and determines that the object indicated by the point clouds acquired in step S101 are the plural objects. As a result, the object recognition device 100 recognizes that an actual location corresponding to the position where the approximate rectangle is generated by the polygon approximation based on the point clouds acquired in step S101 is a recess formed by plural objects (for example, in the example shown in FIG. 2, the planting 30 and the parked vehicle 20), and an object corresponding to the approximate rectangle does not actually exist.

When it is determined by the above processes whether the object indicated by the point clouds is configured with the reflection points 2 of the single object or the reflection points 2 of the plural objects, the controller 10 ends a series of processes related to object recognition.

In addition, it should be noted that it is not always necessary to perform the process to determine which side of the approximate polygon the reflection points 2 constituting the acquired point clouds belong to (processes after step S104), after performing the polygon approximation. For example, when the object indicated by the point clouds is an elongated object, it may be difficult to determine a side to which the point clouds belong. For example, the elongated object existing on a side of a road may not have a great influence on running of a vehicle and may be negligible. Therefore, the processes after step S104 can be performed only when a length of a shortest side among the sides constituting the approximate polygon is equal to or greater than a predetermined value. As a result, the processes after step S104 are performed only for objects other than an elongated object whose side to which the reflection points 2 belong is difficult to determine or an elongated object that is so elongated that it does not need to be recognized, and thus, a calculation load can be reduced.

By tracking the acquired point clouds in a time series, it may be possible to identify an attribute of the object indicated by the point clouds on the basis of a movement manner of the point clouds. More specifically, for example, by measuring a position of an object existing in a surrounding environment in a time series using a so-called time series tracking technique, it may be possible to add an attribute to the object indicated by the point clouds on the basis of a size and a movement manner of the point clouds. In this case, when the object can be clearly identified as a single object based on the attribute of the object indicated by the point clouds, the processes after step S104 can be omitted. As a result, the processes after step S104 are performed only when the object indicated by the point clouds cannot be clearly determined to be a single object, and thus, the calculation load can be reduced.

As described above, by performing the processes described with reference to FIG. 3, the object recognition device 100 in this embodiment can appropriately determine whether the approximate polygon generated by polygon approximate on the grouped point clouds correctly indicates a position of an actual object, or the approximate polygon does not indicate an actual object and there is actually a recess formed by plural objects and then the approximate polygon does not correctly indicate the position of the actual object. As a result, when it is performed the polygon approximation based on the point clouds acquired by recognizing the position of the object existing in the surrounding environment, it is possible to reliably determine whether or not the generated approximate polygon is a result which indicates the position of the actual object correctly.

Meanwhile, when it is determined whether the object indicated by the point clouds acquired by using the sensor 1 is a single object or plural objects, it is not always necessary to perform the polygon approximation based on the point clouds. For example, when distances between the plurality of respective reflection points 2 constituting the point clouds and the sensor 1 can be detected with a high accuracy, the object recognition device 100 can determine without performing the polygon approximation that the plural reflection points 2, which constitute the point clouds when the polygon approximation is performed, are located in the blind zones of the approximate polygon. As a result, it can determine that whether or not the object indicated by the point clouds includes plural objects. More specifically, when there are the reflection points 2 more closer to the sensor 1 on both sides of the reflection points 2 farthest from the sensor 1 among the plural reflection points 2 constituting the acquired point clouds, the object recognition device 100 determines without performing the polygon approximation that the reflection points 2 are located in the blind zones of the approximate polygon if the polygon approximation is performed on the point clouds, and then determines that plural objects are indicated by the point clouds. Also, when there are the reflection points 2 more farther from the sensor 1 on both sides of the reflection points 2 closest to the sensor 1, the object recognition device 100 may be configured to determine without performing the polygon approximation that the reflection points 2 are not located in the blind zones of the approximate polygon if the polygon approximation is performed on the point clouds, and then may determine that the object indicated by the point clouds is a single object. However, normally, a measurement error occurs in the distances between the plurality of respective reflection points 2 and the sensor 1, and thus, from the result acquired by the polygon approximation on the point clouds as described above, it is preferable to determine whether the object indicted by the point clouds is a single object or plural objects in response to determining whether or not the reflection points 2 are located in the blind zone of the approximate polygon.

As described above, the object recognition device 100 in the first embodiment performs the object recognition method using the sensor 1 that acquires the position of the object existing in the surrounding environment as point clouds including the plurality of reflection points 2 (detection points) in the top view. The method includes grouping the point clouds according to a proximity; and determining, when performing polygon approximation on the grouped point clouds, whether or not at least part of the detection points constituting the grouped point clouds are located in a blind zone of an approximate polygon acquired by the polygon approximation on the point clouds with respect to the sensor; recognizing the grouped point clouds as point clouds corresponding to plural objects when it is determined that the detection points are located in the blind zone with respect to the sensor; and recognizing the grouped point clouds as point clouds corresponding to a single object of the approximate polygon when it is determined that the detection points are not located in the blind zone with respect to the sensor. Therefore, it is possible to determine whether or not the object, which is indicated by the approximate polygon acquired by the polygon approximation on the grouped point clouds, exists actually. Since it is possible to determine that the object indicated by the grouped point clouds is the plural objects, it is possible to correctly recognize that the grouped point clouds are point clouds corresponding to a recess formed by the plural object and there is no object at the position.

When the length of the shortest side of the sides constituting the approximate polygon is longer than the predetermined value, the object recognition device 100 in the first embodiment determines whether or not at least part of the reflection points 2 constituting the point clouds corresponds to a side which is located in a blind zone with respect to the sensor 1 among the sides constituting the approximate polygon. In this way, it is possible to determine whether or not the reflection points 2 (detection points) are located in the blind zone only for objects other than an elongated object whose side to which the point clouds belong is difficult to determine or an elongated object that is so elongated that it does not need to be recognized, and thus, the calculation load can be reduced.

The object recognition device 100 in the first embodiment measures the position of the object existing in the surrounding environment in the time series, identifies the attribute of the object measured in the time series, and when the grouped point clouds correspond to an object whose attribute is not identified, determines whether or not at least part of the detection points 2 constituting the point clouds are located in the blind zone of the approximate polygon with respect to the sensor 1. As a result, it can be determined whether or not the reflection points 2 are located in the blind zone of the approximate polygon only when the object indicated by the point clouds cannot be clearly identified to be a single object, and thus, the calculation load can be reduced.

Second Embodiment

Hereinafter, an object recognition device 200 according to a second embodiment of the present invention will be described.

Figure 6:
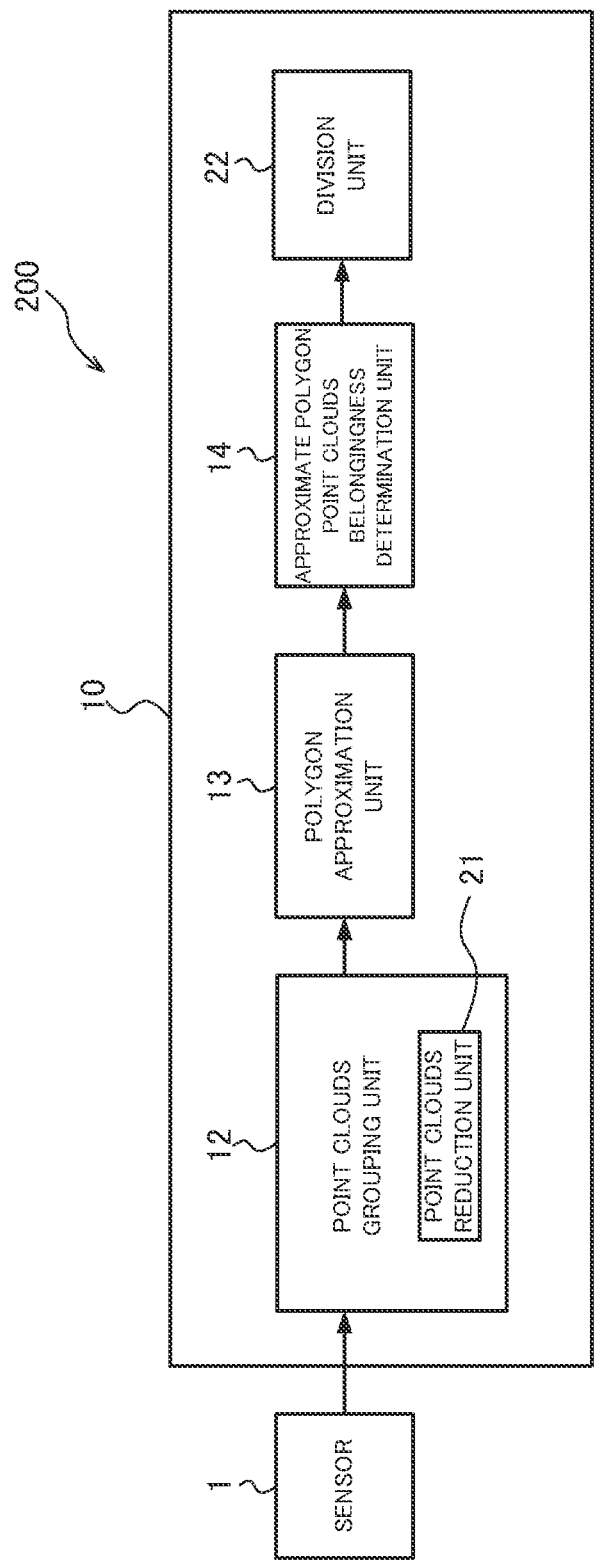
FIG. 6 is a block diagram showing a configuration example of an object recognition device according to a second embodiment.

FIG. 6 is a block diagram showing a configuration example of the object recognition device 200 according to this embodiment. The object recognition device 200 is different from the object recognition device 100 in the first embodiment in that a point clouds reduction unit 21 and a division unit 22 are further provided.

The point clouds reduction unit 21 reduces the number of point clouds (the number of reflection points 2) acquired by the sensor 1.

When it is determined that the object indicated by the acquired point clouds includes the plural objects, the division unit 22 recognizes a plurality of sides constituting an approximate polygon approximated based on the point clouds as plural objects, respectively. Processes performed by the point clouds reduction unit 21 and the division unit 22 will be described with reference to FIG. 7.

Figure 7:
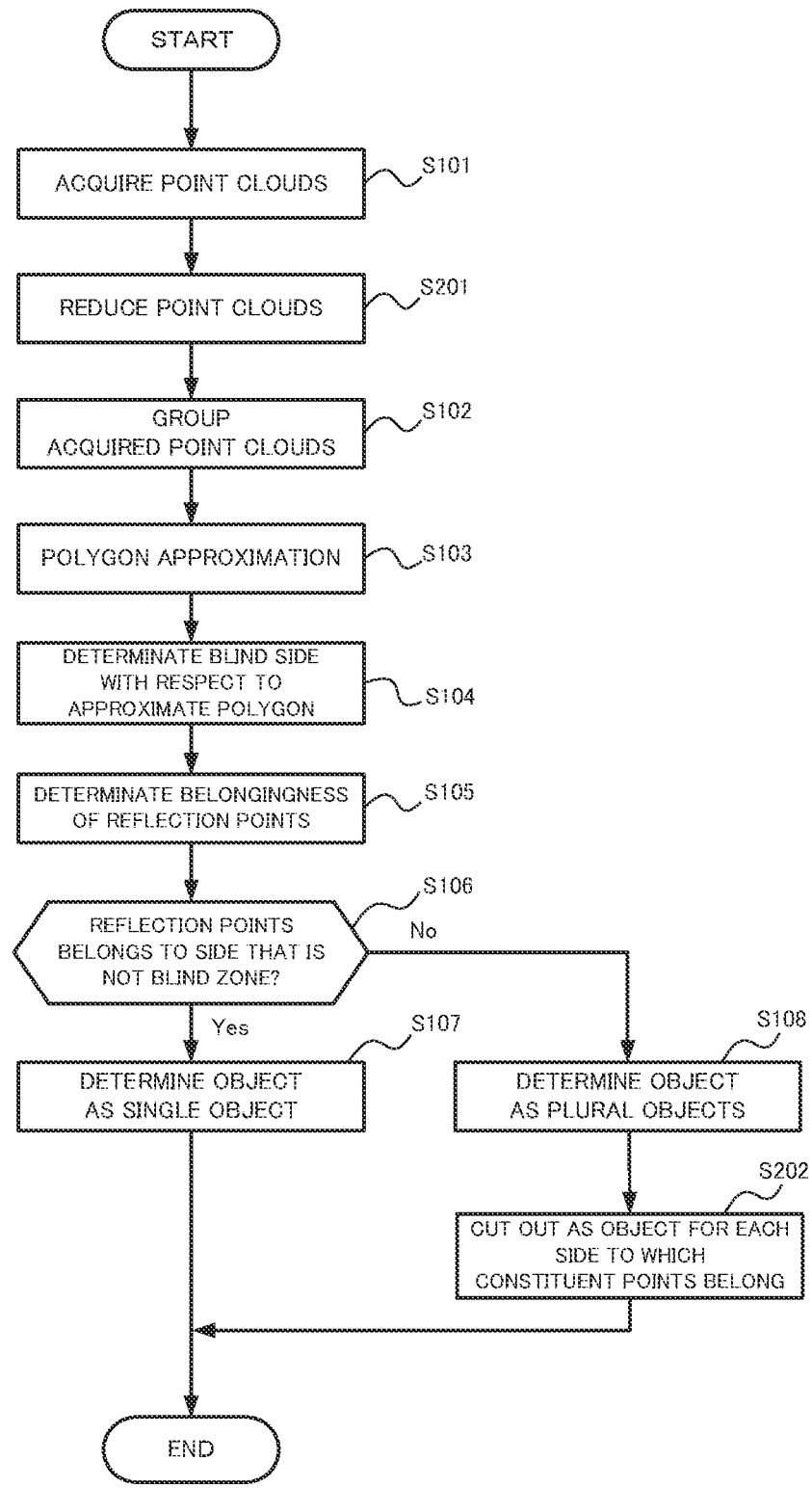
FIG. 7 is a flowchart illustrating an object recognition method by the object recognition device according to the second embodiment.

FIG. 7 is a flowchart illustrating an object recognition method by the object recognition device 200 according to this embodiment. Processes illustrated in the flowchart are programmed in the controller 10 so as to be constantly performed at regular intervals while the object recognition device 200 is activated. It is different from the object recognition method in the first embodiment described above with reference to FIG. 3 in that step S201 and step S202 are added. Hereinafter, the difference from the first embodiment will be mainly described, and descriptions of the same steps as in the first embodiment will be omitted.

In step S201, the controller 10 reduces the point clouds acquired in step S101. A reduction method is not particularly limited, and for example, a voxel filter may be used. By reducing the point clouds in the step, a calculation load of later processes performed based on the point clouds can be reduced. If it is unnecessary to reduce the calculation load, it is unnecessary to perform this process in step S101, which is not a necessary process.

Step S202 is a process performed when it is determined that the object indicated by the acquired point clouds includes the plural objects. The controller 10 divides each side to which the reflection points 2 belong, that is, each blind zone side, from the sides constituting the approximate rectangle. The controller 10 performs a process of cutting out and recognizing (dividing and recognizing) each blind side. That is, the controller 10 recognizes that the reflection points 2 corresponding to each blind side are the reflection points 2 corresponding to a single object. Details of the method of cutting out and recognizing an object based on blind zone sides (object division method) will be described with reference to FIG. 8. For the sake of simplicity, in the following description, a matter that the reflection points 2 are recognized as the reflection points 2 corresponding to a single object for each blind side is expressed as "cutting out" or "object division".

FIG. 8 is a diagram illustrating an object division method performed by the object recognition device 200 according to the embodiment. Rectangles whose four corners are indicated by A to D in the diagram are rectangles (approximate quadrangles) that are approximated to rectangles based on the point clouds acquired in step S101.

Figure 8A:
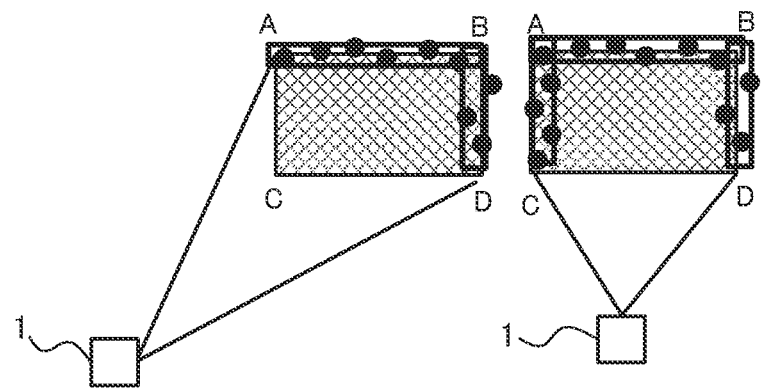
FIG. 8 is a flowchart illustrating the object recognition method by the object recognition device according to the second embodiment.

FIG. 8(a) is a diagram illustrating an object division method performed when it is determined that the object indicated by the point clouds includes plural objects. As described with reference to FIG. 4 in the first embodiment, it is identified in step S106 that the reflection points 2 constituting the point clouds belong to the blind sides, and then it is determined that the object indicated by the point clouds include the plural objects.

According to the object division in this embodiment, the reflection points 2 corresponding to the blind sides are recognized as the reflection points 2 corresponding to the single object for each blind side to which the reflection points 2 belong. For example, in a diagram on a left side of FIG. 8(a), by object division, for each blind side (side A-B and side B-D) to which the reflection points 2 belong, the reflection points 2 corresponding to each blind side are cut out as two rectangular single objects (each object having a shape shown by a thick line frame in the diagram) according to distribution of the point clouds. As another example, in a diagram on a right side of FIG. 8(b), by the object division, for each blind side (the side A-B, side A-C, and the side B-D) to which the reflection points 2 belong, the reflection points 2 corresponding to each blind side are cut out as three rectangular single objects (each object having the shape shown by the thick line frame in the diagram) according to the distribution of the point clouds. These cut out quadrangular single objects (hereinafter, simply rectangular objects) correspond to a position of an actual object existing in the surrounding environment, and thus, the object recognition device 200 can more correctly recognize the position of the object existing in the surrounding environment based on the rectangular objects. For example, when the diagram on the left side of FIG. 8(a) is a result of detecting the surrounding environment shown in FIG. 2, a rectangular object related to the side A-B corresponds to the planting 30, and a rectangular object related to the side B-D corresponds to the rear end of the parked vehicle 20.

As shown in FIG. 8(a), it is not always necessary to cut out all the blind sides to which the reflection points 2 belong, and a part of at least one or more blind sides may be cut out as specified sides. In this case, for example, a side having a large number of reflection points 2 belonging to the blind side or a side having a large ratio of the number of reflection points 2 according to the length of the blind side may be preferentially cut out as the specified side.

When it is determined that an object exists in the surrounding environment of the object recognition device 200, not only the sensor 1 but also at least one or more other sensors different from the sensor 1 may be used, and the object existing in the surrounding environment may be simultaneously detected by using a plurality of sensors. In this case, only when the object detected by the sensor 1 matches the object detected by other sensors different from the sensor 1, the matched object can be recognized as an object that actually exists in the surrounding environment. As a result, a position of an object existing in the surrounding environment can be detected with a higher accuracy than that using only the sensor 1.

When the object recognition device 200 is configured in this way, a plurality of rectangular objects corresponding to the plural objects detected by the sensor 1 are generated by performing the above object division, and thus, it is possible to more easily determine matching between the object detected by the sensor 1 and the object detected by the other sensors different from the sensor 1. An example of a method for determining the matching of objects detected by a plurality of sensors will be described later in a description of a third embodiment.

Figure 8B:
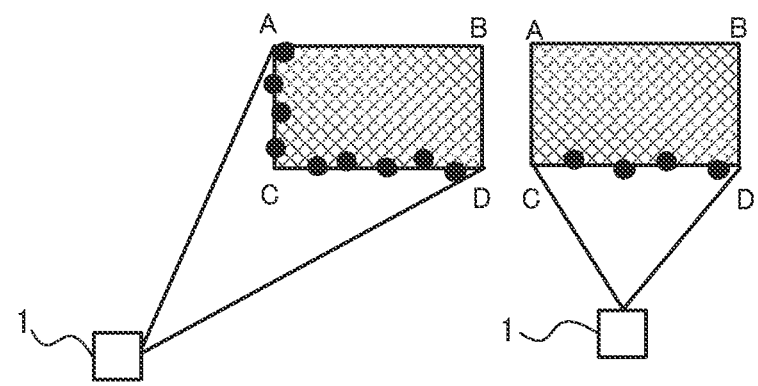

FIG. 8(b) is a diagram illustrating a case where it is determined that the object indicated by the point clouds is not the plural objects. As shown in the diagram, when the reflection points 2 belong to a side (observable side) that is not a blind side, the object indicated by the point clouds is determined to be a single object (step S107), and thus, the object division is not performed.

As described above, according to the object recognition device 200 in the second embodiment, when an object is recognized as plural objects, each side corresponding to the reflection points 2 among the sides constituting the approximate polygon is recognized as a single object. Therefore, the position of the object existing in the surrounding environment can be correctly recognized.

According to the object recognition device 200 in the second embodiment, the side recognized as a single object is determined according to the number of corresponding reflection points 2. Therefore, for example, an object that is close to the sensor 1 and reflects more laser lights output from the sensor 1 can be preferentially recognized as a single object.

Third Embodiment

Hereinafter, an object recognition device 300 according to the third embodiment of the present invention will be described.

Figure 9:
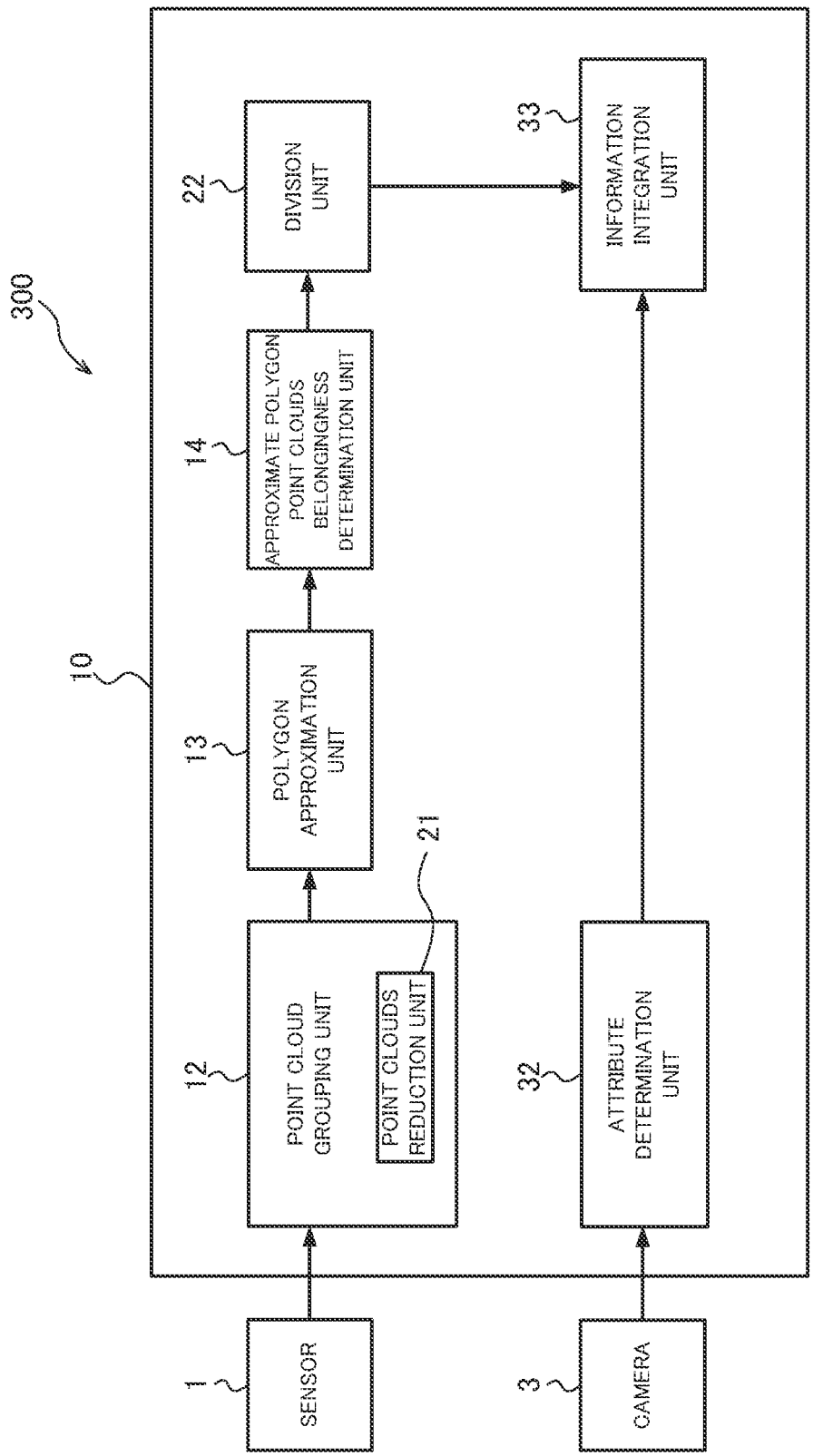
FIG. 9 is a block diagram showing a configuration example of an object recognition device according to a third embodiment.

FIG. 9 is a block diagram showing a configuration example of the object recognition device 300 according to this embodiment. The object recognition device 300 is different from the object recognition device 200 in the second embodiment in that a camera 3, an attribute determination unit 32, and an information integration unit 33 are further provided. Hereinafter, the difference from the second embodiment will be mainly described.

The camera 3 acts as an attribute identification source acquisition unit that acquires information for determining an attribute of an object existing in the surrounding environment in the attribute determination unit 32 described later. The attribute here is information representing a characteristic of the object, which is mainly identified from a shape of the object, such as a person (pedestrian), a car, a guardrail, and a planting. The camera 3 captures an image of the surrounding environment and provides captured video data (camera images) to the attribute determination unit 32 as attribute identification source. It should be noted that a configuration adopted as the attribute determination source acquisition unit is not limited to the camera 3. The attribute identification source acquisition unit may be another sensor capable of acquiring information that can identify an attribute by subsequent processes.

The attribute determination unit 32 identifies an attribute of each object existing in the surrounding environment (surrounding object) based on the camera image acquired by the camera 3, and adds the identified attribute to the surrounding object.

The information integration unit 33 integrates the surrounding object to which the attribute is added by the attribute determination unit 32 and the information about the object detected by using the sensor 1. Details of the processes performed by the respective functional units will be described with reference to FIGS. 10 and 11.

Figure 10:
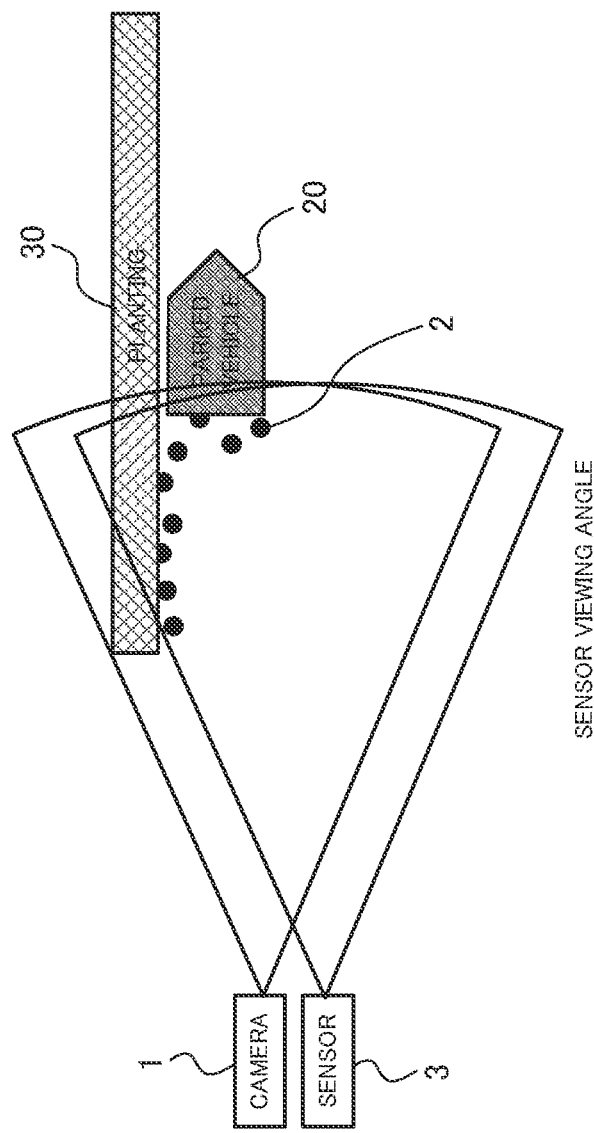
FIG. 10 is a diagram illustrating information on an object existing in a surrounding environment acquired by the object recognition device including a sensor and a camera.

First, a scene in which the information about the object acquired by the sensor 1 and the camera 3 is integrated will be described with reference to FIG. 10. FIG. 10 is a diagram illustrating a method for causing the sensor 1 and the camera 3 according to the third embodiment to acquire information about an object existing in the surrounding environment.

First, the method for causing the sensor 1 to acquire the information about the object existing in the surrounding environment is the same as the method described with reference to FIG. 2 in the first embodiment. That is, the sensor 1 acquires the point clouds corresponding to the position of the side surface, on the sensor 1 side, of the object existing in the fan-shaped sensor viewing angle extending from the sensor 1. The point clouds acquired by the sensor 1 are identified as a single object or a plurality of rectangular objects cut out by the object division through the polygon approximation.

As shown in the diagram, the camera 3 acquires an image of the surrounding environment in the same direction as the sensor 1. That is, according to a scene shown in FIG. 10, the camera 3 acquires an object similar to the object indicated by the point clouds acquired by the sensor 1, that is, a camera image including the side surface of the planting 30 and the rear end of the parked vehicle 20 as information about the object existing in the surrounding environment.

Figure 11:
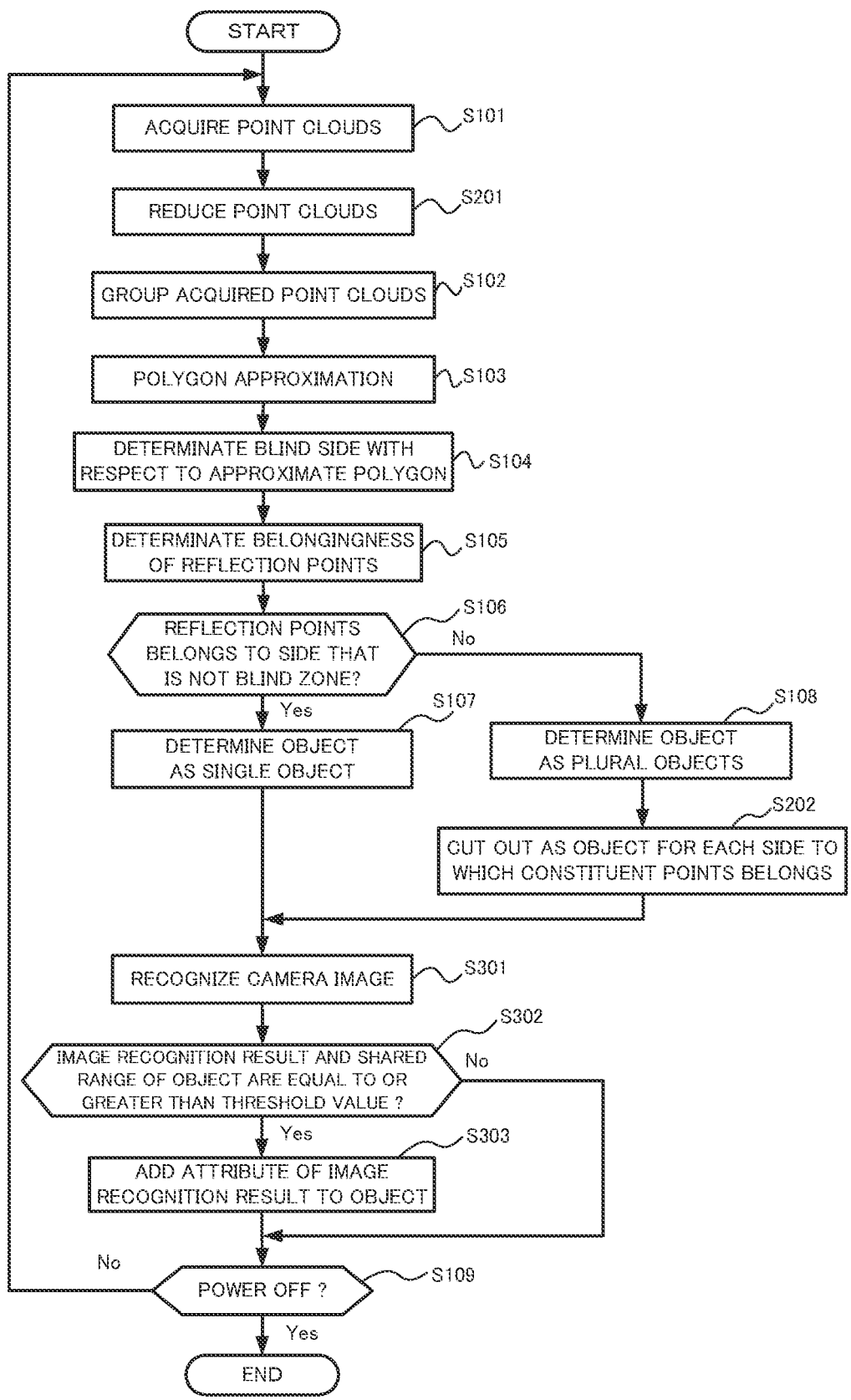
FIG. 11 is a flowchart illustrating an object recognition method by the object recognition device according to the third embodiment.

FIG. 11 is a flowchart illustrating an object recognition method by the object recognition device 300 according to this embodiment. Processes illustrated in the flowchart are programmed in the controller 10 so as to be constantly performed at regular intervals while the object recognition device 300 is activated. It is different from the object recognition method in the second embodiment described above with reference to FIG. 7 in that step S301 to step S303 are added. Hereinafter, the difference from the second embodiment will be mainly described, and the descriptions of the same steps as in the second embodiment will be omitted.

In step S301, the controller 10 identifies an attribute of the surrounding object based on the image acquired by the camera 3.

In step S302, the controller 10 determines whether or not the information about the object acquired by the sensor 1 matches the information about the object acquired by the camera 3. In this embodiment, matching of the information is determined based on a coincidence degree of the information about the object.

The coincidence degree may be calculated based on, for example, a positional relation between the object detected by the sensor 1 and the object detected by the camera 3. Specifically, for example, a distance from the sensor 1 to an object existing in the surrounding environment is detected and a distance from the camera 3 to the surrounding object is detected, and the coincidence degree may be calculated based on a difference between the distances between the respective objects from the sensor 1 and the camera 3. It can be determined that the closer the distances are, the higher the coincidence degree between the objects detected by the sensor 1 and the camera 3 is. When the calculated coincidence degree exceeds a predetermined threshold value, it is determined that the information about the respective objects matches. In addition to or in place of such a calculation method, another calculation method may be adopted. Another calculation method for the coincidence degree will be described with reference to FIG. 12.

Figure 12:
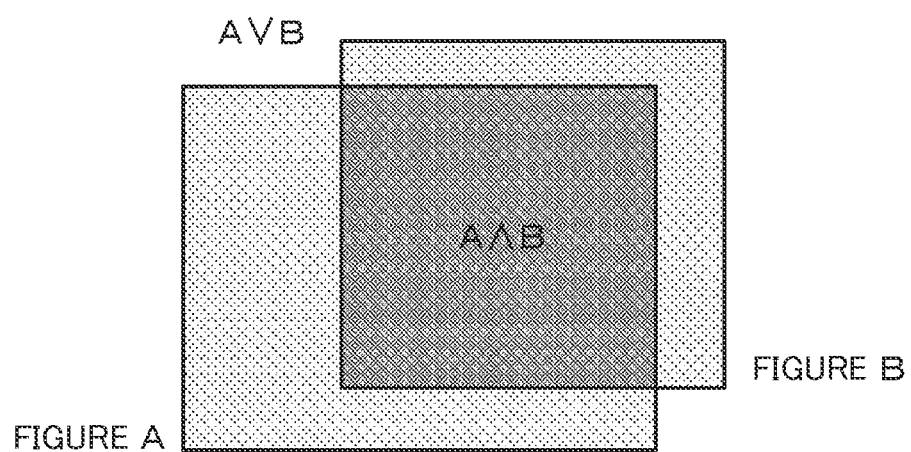
FIG. 12 is a diagram illustrating a method for determining whether or not information about an object acquired by the sensor matches information about an object acquired by the camera.

FIG. 12 is a diagram illustrating a method for determining whether or not the information about the object acquired by the sensor 1 matches the information about the object acquired by the camera 3.

First, in the camera image acquired by the camera 3, an occupied frame of the object in the camera image (a frame surrounding an outer shape of the object in the image) is extracted. For example, when the parked vehicle 20 shown in FIG. 10 is shown in the image acquired by the camera 3, a figure B which substantially matches an outer shape of the rear end surface of the parked vehicle 20 is extracted as the occupied frame of the parked vehicle 20 that appears when the parked vehicle 20 is captured from behind. Then, an attribute "car" identified in step S302 is given to the figure B.

Meanwhile, from the information about the object generated based on the point clouds acquired by the sensor 1, a figure A is extracted as a rectangular projection frame showing the outer shape of the object when viewed from a horizontal direction. Specifically, when the object indicated by the point clouds acquired by the sensor 1 is a single object, in step S103, the approximate rectangle acquired by the polygon approximation is projected onto the camera image to make the approximate rectangle two-dimensional, thereby generating the figure A as a projection frame. When the object indicated by the point clouds acquired by the sensor 1 includes plural objects, a rectangular object cut out by the object division is projected onto the camera image and making it two-dimensional, thereby generating the figure A. In the camera image, the figure A is projected at a position and a size that substantially coincide with a position and a size of the point clouds acquired by the sensor 1. However, since the approximate polygon that is a basis of the figure A is the information generated by projecting the approximate polygon on the two-dimensional plane, the information about a height of the figure A is not included. Therefore, an appropriate constant value is set with respect to a size of the figure A in a height direction as the object existing on the road. In this way, the figure A generated based on the point clouds acquired by the sensor 1 is projected in the camera image from which the figure B is extracted.

In the camera image, a shared range (a matching range) between the figure B as the occupied frame of the imaged surrounding object and the figure A as the projection frame of the approximate polygon generated based on the point clouds or the cut out rectangular object is calculated. When the calculated shared range is equal to or greater than the threshold value, that is, when the following Formula (1) is satisfied, each object acquired separately by the sensor 1 and the camera 3 is determined to match (same object). The threshold value is appropriately set in consideration of a performance, etc., of the sensor 1 and the camera 3 to be adopted as a reliable value for matching of each object.

[Formula 1]

$$(A \wedge B)/(A \vee B) > \text{threshold value} \quad (1)$$

In step S301, when it is determined that the information about the object acquired by the sensor 1 matches the information about the object acquired by the camera 3 and determined that these objects are the same object, a process in the following step S302 is performed. When the above Formula (1) is not satisfied and the information about the object acquired by the sensor 1 does not match the information about the object acquired by the camera 3, ending one cycle of the flow, then the processes from step S101 are repeatedly performed.

In step S302, the controller 10 integrates the information about the object acquired by the sensor 1 and the information about the object in the camera image determined to match the object. Therefore, the attribute identified based on the information acquired by the camera 3 is added to the object acquired by the sensor 1. As a result, an amount, an accuracy, and a reliability of the information about the object acquired by the sensor 1 can be improved.

As described above, according to the object recognition device 300 in the third embodiment, a recognition unit (camera 3) different from the sensor 1 is used to recognize an object existing in the surrounding environment and identify an attribute of the object, then it is determined whether or not the plural objects or the single object recognized by using the sensor 1 matches the object recognized by using the camera 3. Then, when it is determined that the plural objects or the single object matches the object recognized by using the recognition unit, the plural objects or the single object is applied with an attribute. As a result, an attribute can be added to the object whose attribute is unknown only by the information about the object acquired by the sensor 1. Since the attribute is added in response to recognizing the same object multiple and determining the objects matching, the reliability of the information about the object acquired by the sensor 1 can be improved.

According to the object recognition device 300 in the third embodiment, the distance from the sensor 1 to the object existing in the surrounding environment is detected, the distance from the camera 3 to the object existing in the surrounding environment is detected, and it is determined whether or not the plural objects or the single object recognized by using the sensor 1 and the object recognized by using the camera 3 are the same object based on the distance from the sensor 1 to the object and the distance from the camera 3 to the object. As a result, whether or not the respective objects match can be determined based on the positional relation between the object detected by the sensor 1 and the object detected by the camera 3.

According to the object recognition device 300 in the third embodiment, the camera 3 acquires the image including the object existing in the surrounding environment, the plural objects or the single object recognized by the sensor 1 is projected onto the image, the shared range between the object included in the image and the plural objects or the single object projected on the image are calculated, and based on the calculated shared range, it is determined whether or not the plural objects or the single object recognized by using the sensor 1 matches the object recognized by using the camera 3. Therefore, it can be determined whether or not the respective objects match based on the shared range in the surface or space of the object detected by the sensor 1 and the object detected by the camera 3. As a result, information can be integrated only for objects that are likely to be the same object.

Although the embodiments of the present invention are described above, the above embodiments merely show some of application examples of the present invention and do not intend to limit a technical scope of the present invention to the specific configurations of the above embodiments. The above embodiments can be appropriately combined as long as there is no contradiction.

The invention claimed is:

1. An object recognition method using a sensor configured to acquire a position of an object existing in a surrounding environment as point clouds including a plurality of detection points in a top view, the method comprising:
    grouping the point clouds according to a proximity;
    determining, when performing polygon approximation on the grouped point clouds, whether or not at least part of the detection points constituting the grouped point clouds are located in a blind zone of an approximate polygon acquired by the polygon approximation on the point clouds with respect to the sensor;
    recognizing the grouped point clouds as point clouds corresponding to plural objects when it is determined that the detection points are located in the blind zone with respect to the sensor; and
    recognizing the grouped point clouds as point clouds corresponding to a single object of the approximate polygon when it is determined that the detection points are not located in the blind zone with respect to the sensor.

2. The object recognition method according to claim 1, further comprising:
    recognizing, when the object is recognized as the plural objects, the detection points which correspond to a specific side that is at least one side of sides constituting the approximate polygon, as detection points corresponding to the single object.

3. The object recognition method according to claim 2, further comprising:
    determining the specific side according to a number of corresponding detection points.

4. The object recognition method according to claim 1, further comprising:
    determining, when a length of a shortest side of sides constituting the approximate polygon is longer than a predetermined length, whether or not at least part of the detection points constituting the point clouds are located in the blind zone of the approximate polygon with respect to the sensor.

5. The object recognition method according to claim 1, further comprising:

measuring the position of the object existing in the surrounding environment in a time series;

identifying an attribute of the object measured in the time series; and determining, when the grouped point clouds correspond to an object whose attribute is not identified, whether or not at least part of the detection points constituting the point clouds are located in the blind zone of the approximate polygon with respect to the sensor.

6. The object recognition method according to claim 1, further comprising:

recognizing the object existing in the surrounding environment and identifying an attribute of the object by using a recognition unit different from the sensor;

determining whether or not the plural objects or the single object recognized by using the sensor match the object recognized by using the recognition unit; and adding the attribute to the plural objects or the single object recognized by using the sensor when it is determined that the plural objects or the single object match the object recognized by using the recognition unit.

7. The object recognition method according to claim 6, further comprising:

detecting a distance from the sensor to the object existing in the surrounding environment;

detecting a distance from the recognition unit to the object existing in the surrounding environment; and determining whether or not the plural objects or the single object recognized by using the sensor and the object recognized by using the recognition unit are a same object on a basis of the distance from the sensor to the object and the distance from the recognition unit to the object.

8. The object recognition method according to claim 1, further comprising:

acquiring an image including the object existing in the surrounding environment with a recognition unit;

projecting the plural objects or the single object recognized by using the sensor onto the image;

calculating a matching range between an occupied area which is an area occupied by the object on the image and a projected area which is an area occupied by the plural objects or the single object projected on the image; and determining whether or not the plural objects or the single object recognized by using the sensor and the object recognized by using the recognition unit are a same object on a basis of the calculated matching range.

9. An object recognition device, comprising: a sensor configured to acquire a position of an object existing in a surrounding environment as point clouds including a plurality of detection points in a top view; and a controller configured to process the point clouds acquired by the sensor, wherein the controller is further configured to:

group the point clouds according to a proximity of the point clouds;

determine, when performing polygon approximation on the grouped point clouds, whether or not at least part of the detection points constituting the grouped point clouds are located in a blind zone of an approximate polygon acquired by the polygon approximation on the point clouds with respect to the sensor;

recognize the grouped point clouds as point clouds corresponding to plural objects when it is determined that the detection points are located in the blind zone with respect to the sensor, and recognize the grouped point clouds as point clouds corresponding to a single object of the approximate polygon when it is determined that the detection points are not located in the blind zone with respect to the sensor.

* * * * *